(12) United States Patent
Wei et al.

(10) Patent No.: US 8,948,827 B2
(45) Date of Patent: Feb. 3, 2015

(54) MOBILE COMMUNICATION DEVICE

(71) Applicant: Acer Incorporated, New Taipei (TW)

(72) Inventors: Wan-Chu Wei, New Taipei (TW);
Pei-Yuan Chiu, New Taipei (TW);
Chih-Hua Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 85 days.

(21) Appl. No.: 13/887,374

(22) Filed: May 6, 2013

(65) Prior Publication Data

US 2014/0113693 A1    Apr. 24, 2014

(30) Foreign Application Priority Data

Oct. 19, 2012    (TW) .............................. 101138734 A

(51) Int. Cl.
*H04M 1/00* (2006.01)
*H04B 1/38* (2006.01)
*H01Q 5/00* (2006.01)
*H01Q 1/24* (2006.01)
*H01Q 9/42* (2006.01)

(52) U.S. Cl.
CPC .............. *H04B 1/3833* (2013.01); *H01Q 1/243* (2013.01); *H01Q 5/0062* (2013.01); *H01Q 9/42* (2013.01); *H04B 1/3888* (2013.01)
USPC .................... 455/575.7; 455/90.3; 455/552.1; 343/700 MS; 343/866

(58) Field of Classification Search
CPC ..... H01Q 1/243; H01Q 21/30; H01Q 5/0062; H01Q 1/38; H01Q 9/30; H04B 1/0064; H04B 1/3833
USPC ............ 455/90.3, 550.1, 552.1, 553.1, 575.1, 455/575.7; 343/700 MS, 748, 767, 866, 870
See application file for complete search history.

(56) References Cited

U.S. PATENT DOCUMENTS

| | | | |
|---|---|---|---|
| 7,468,700 B2 * | 12/2008 | Milosavlejevic | 343/700 MS |
| 8,711,043 B2 * | 4/2014 | Chen et al. | 343/700 MS |
| 8,760,360 B2 * | 6/2014 | Kuo | 343/876 |
| 2011/0241949 A1 | 10/2011 | Nickel et al. | |
| 2012/0044114 A1 | 2/2012 | Eom et al. | |

* cited by examiner

*Primary Examiner* — Quochien B Vuong
(74) *Attorney, Agent, or Firm* — Jianq Chyun IP Office

(57) ABSTRACT

A mobile communication device includes a substrate, a metal frame, a feeding portion, and a parasitic portion. The substrate includes a ground plane and a non-ground area. The metal frame surrounds the substrate and includes a plurality of gaps to form a first frame element and a second frame element separated from each other. The first frame element is electrically connected to the ground plane. The feeding portion and the parasitic portion are located in the non-ground area. A first end of the feeding portion is configured to receive a feeding signal, and a second end of the feeding portion is an open end. The parasitic portion is electrically connected to the second frame element and the ground plane. The feeding portion, the second frame element, and the parasitic portion of the mobile communication device constitute a loop antenna.

10 Claims, 3 Drawing Sheets a feeding portion to receive or emit a first radio frequency signal. A length of the feeding portion is ¼ a wavelength of the first radio frequency signal.

According to an exemplary embodiment of the invention, the loop antenna excites a second resonant mode through the second frame element and the parasitic portion to receive or emit a second radio frequency signal. A length of a path extending from a second end of the second frame element to a second end of the parasitic portion along the second frame element and the parasitic portion is ¼ a wavelength of the second radio frequency signal.

According to an exemplary embodiment of the invention, the mobile communication device further includes an adjusting part. The adjusting part is located in the non-ground area and electrically connected to the second frame element. Besides, the adjusting part of the mobile communication device constitutes a part of the loop antenna.

According to an exemplary embodiment of the invention, the loop antenna excites a second resonant mode through the adjusting part, the second frame element, and the parasitic portion to receive or emit a second radio frequency signal. A length of a path extending from a second end of the adjusting part to a second end of the parasitic portion along the adjusting part, the second frame element, and the parasitic portion is ¼ a wavelength of the second radio frequency signal.

In view of the above, the mobile communication device described herein is equipped with the metal frame which embellishes the exterior of the mobile communication device. Besides, the second frame element of the metal frame constitutes the antenna. Thereby, the negative impact of the metal frame on communication quality of the mobile communication device is lessened. Moreover, the first frame element of the metal frame which cannot serve as the antenna is electrically connected to the ground plane, which is conducive to the improvement of the communication quality of the mobile communication device.

In order to make the aforementioned and other features and advantages of the invention more comprehensible, embodiments accompanying figures are described in detail below.

MOBILE COMMUNICATION DEVICE

CROSS-REFERENCE TO RELATED APPLICATION

This application claims the priority benefit of Taiwan application serial no. 101138734, filed on Oct. 19, 2012. The entirety of the above-mentioned patent application is hereby incorporated by reference herein and made a part of this specification.

BACKGROUND OF THE INVENTION

1. Field of the Invention

The invention relates to a mobile communication device; more particularly, the invention relates to a mobile communication device having a metal frame.

2. Description of Related Art

With rapid development of wireless communication technology, various types of mobile communication devices, such as smart phones, tablet PCs, and notebooks, have been continuously launched and upgraded, and requirements for functions and exterior design of the mobile communication devices also become more and more diversified to satisfy consumers' needs. For instance, in consideration of the requirements for exceptional looks and exquisite appearances, most of the existing mobile communication devices are designed to have a metal texture, e.g., to be equipped with metal back covers or metal frames.

Nonetheless, since the radiation characteristics of antennas are apt to be affected by the surrounding metal objects, the metal frame design of the mobile communication devices often poses a negative impact on the communication quality of the mobile communication devices. That is, even though the appearance design with the metal texture brings a sense of fashion to the mobile communication devices, the metallic appearance is very much likely to hinder the antenna design and impair the communication quality of the mobile communication devices.

SUMMARY OF THE INVENTION

The invention is directed to a mobile communication device with a metal frame which embellishes the exterior of the mobile communication device. Besides, parts of the metal frame constitute an antenna. Thereby, the negative impact of the metal frame on communication quality of the mobile communication device may be lessened.

In an exemplary embodiment of the invention, a mobile communication device that includes a substrate, a metal frame, a feeding portion, and a parasitic portion is provided. The substrate includes a ground plane and a non-ground area. The metal frame surrounds the substrate and includes a plurality of gaps to form a first frame element and a second frame element, and the first and second frame elements are separated from each other. Here, the first frame element is electrically connected to the ground plane. The feeding portion and the parasitic portion are located in the non-ground area. A first end of the feeding portion is configured to receive a feeding signal, a second end of the feeding portion is an open end, and the parasitic portion is electrically connected to the second frame element and the ground plane. The feeding portion, the second frame element, and the parasitic portion of the mobile communication device constitute a loop antenna.

According to an exemplary embodiment of the invention, the loop antenna excites a first resonant mode through the

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
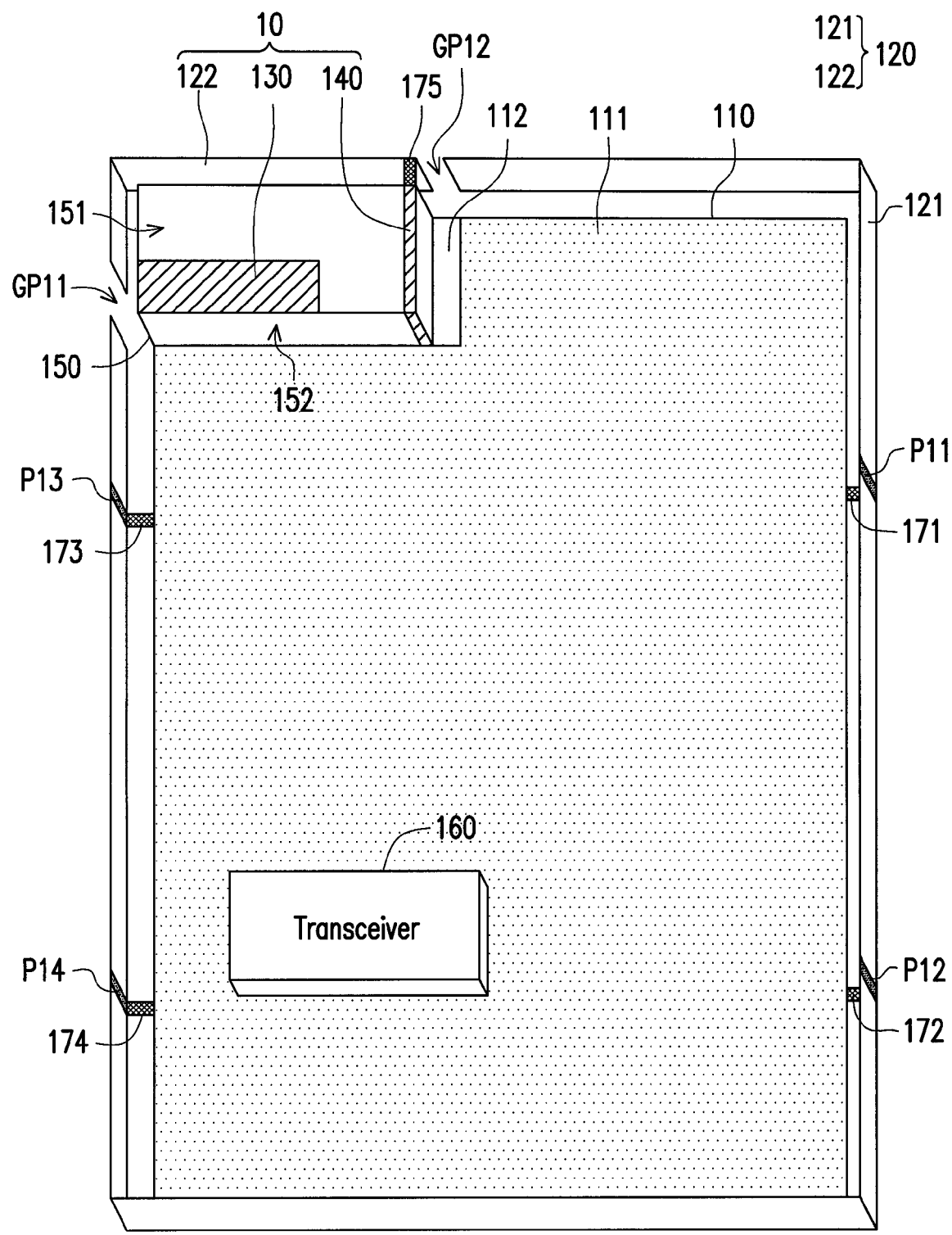
FIG. 1 is a schematic view illustrating a mobile communication device according to an exemplary embodiment of the invention.

FIG. 1 is a schematic view illustrating a mobile communication device according to an exemplary embodiment of the invention. With reference to FIG. 1, the mobile communication device 100 includes a substrate 110, a metal frame 120, a feeding portion 130, a parasitic portion 140, a support element 150, and a transceiver 160. A ground plane 111 is located on a first surface of the substrate 110, and the rest of the first surface of the substrate 110 is considered as a non-ground area 112 (where no ground plane 111 is located). In other words, the substrate 110 includes the ground plane 111 and the non-ground area 112.

The feeding portion 130 and the parasitic portion 140 are located in the non-ground area 112 and are located on a plane different from the ground plane 111. That is, the relative locations of the feeding portion 130 and the parasitic portion 140 projected onto the substrate 110 are not overlapped with the ground plane 111. For instance, according to an exemplary embodiment of the invention, the support element 150 shown in FIG. 1 is located on the non-ground area 112 and includes a first surface 151 and a second surface 152. The first surface 151 of the support element 150 is parallel to the ground plane 111, and the second surface 152 of the support element 150 is perpendicular to the ground plane 111. The feeding portion 130 is located on the first surface 151 of the support element 150, and the parasitic portion 140 is located on the first surface 151 and the second surface 152 of the support element 150.

The metal frame 120 surrounds the substrate 110 and includes two gaps GP11 and GP12. The metal frame 120 contains a first frame element 121 and a second frame element 121 that are separated from each other by the two gaps GP11 and GP12. The first frame element 121 is electrically connected to the ground plane 111. For instance, according to the exemplary embodiment shown in FIG. 1, the first frame element 121 is electrically connected to the ground plane 111 through a plurality of conductive elements 171 to 174. The conductive elements 171 to 174 may be any element with conductivity, such as clips or screws. Namely, the first frame element 121 has a plurality of ground points P11 to P14 connected to the ground plane 111.

The second frame element 122 is electrically connected to the parasitic portion 140. In the exemplary embodiment shown in FIG. 1, for instance, the non-ground area 112 is located in a corner of the substrate 110, and the second frame element 122 is opposite to the support element 150 on the non-ground area 112. A first end of the second frame element 122 is directly or indirectly electrically connected to a first end of the parasitic portion 140. For instance, in the exemplary embodiment shown in FIG. 1, the first end of the second frame element 122 is indirectly electrically connected to the parasitic portion 140 through a conductive element 175. A second end of the second frame element 122 is an open end, and a second end of the parasitic portion 140 is electrically connected to the ground plane 111. A first end of the feeding portion 130 is opposite to the gap GP11 and serves to receive a feeding signal, and a second end of the feeding portion 130 is an open end.

As to the operation of the mobile communication device 100, the transceiver 160 may provide the feeding signal to the first end of the feeding portion 130 through a coaxial wire (not shown), such that the feeding portion 130, the second frame element 122, and the parasitic portion 140 of the mobile communication device 100 together constitute a loop antenna 10. In other words, the metal frame 120 embellishes the exterior of the mobile communication device 100, and parts of the metal frame 120 (i.e., the second frame element 122) may further act as the antenna. Thereby, the negative impact of the metal frame 120 on the communication quality of the mobile communication device 100 is lessened. Moreover, the first frame element 121 of the metal frame 120 which cannot serve as the antenna is electrically connected to the ground plane 111, which is conducive to the improvement of the communication quality of the mobile communication device 100.

Besides, the loop antenna 10 constituted by the feeding portion 130, the second frame element 122, and the parasitic portion 140 is further characterized by multi-band operations. For instance, when the first end of the feeding portion 130 receives the feeding signal, the signal from the feeding portion 130 is coupled to the second frame element 122 and thereby enables the loop antenna 10 to excite a plurality of resonant modes. For instance, the loop antenna 10 excites a first resonant mode through the feeding portion 130 to receive or emit a first radio frequency signal in the GSM1800/1900/UMTS frequency band. The loop antenna 10 may further excite a second resonant mode through the second frame element 122 and the parasitic portion 140 to receive or emit a second radio frequency signal in the GSM850/900 frequency band.

As to the physical structure of the mobile communication device 100, a length of the feeding portion 130 is ¼ a wavelength of the first radio frequency signal. In addition, a length of a path extending from the second end of the second frame element 122 to the second end of the parasitic portion 140 along the second frame element 122 and the parasitic portion 140 is ¼ a wavelength of the second radio frequency signal. Note that the embodiment shown in FIG. 1 exemplifies the loop antenna 10 but does not serve to limit the invention.

Figure 2:
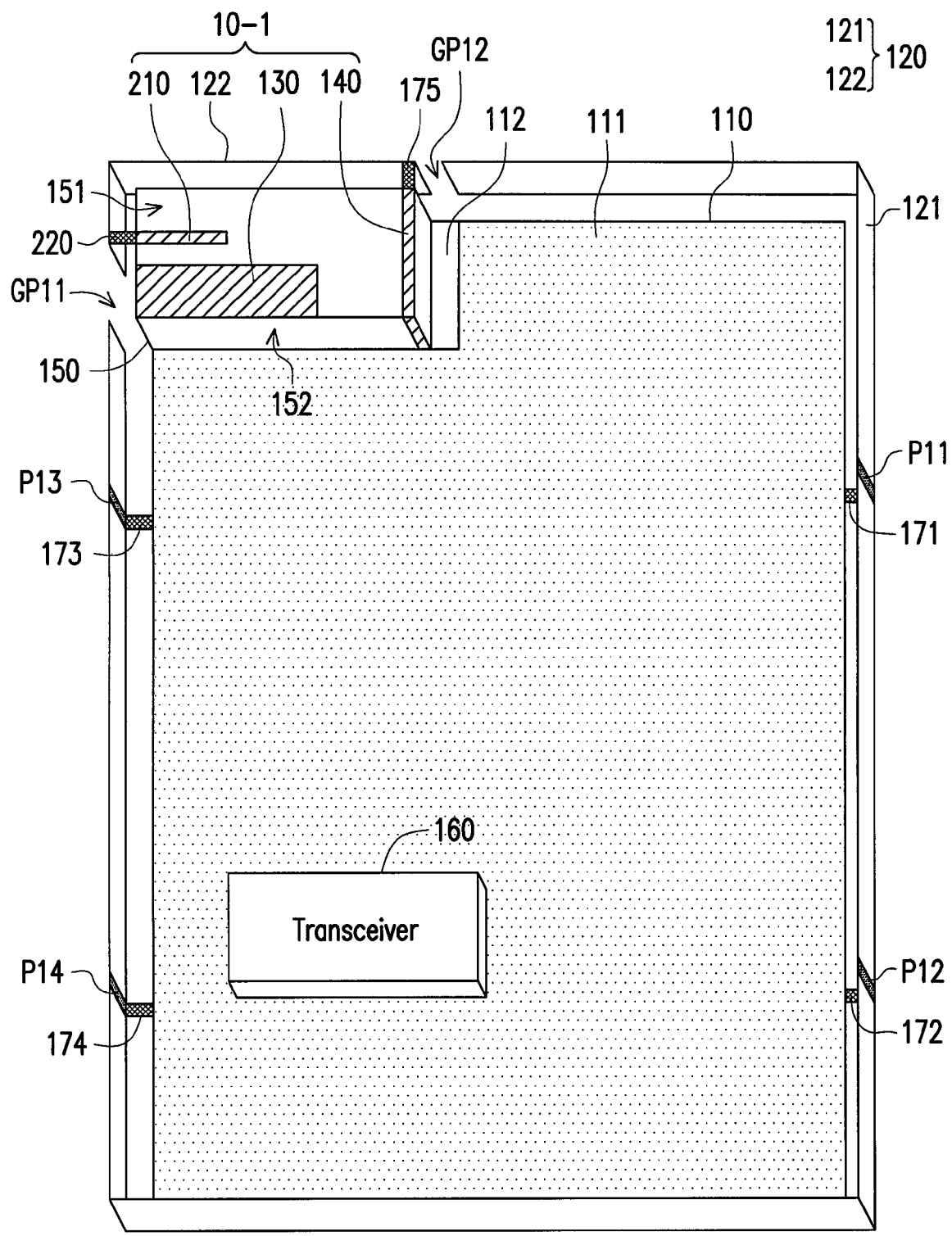
FIG. 2 is a schematic view illustrating a mobile communication device according to another exemplary embodiment of the invention.

FIG. 2 is a schematic view illustrating a mobile communication device according to another exemplary embodiment of the invention. The difference between the embodiment shown in FIG. 1 and that shown in FIG. 2 lies in that the loop antenna 10-1 shown in FIG. 2 further includes an adjusting part 210.

Specifically, as shown in FIG. 2, the adjusting part 210 and the feeding portion 130 described in the present exemplary embodiment are together located on the first surface 151 of the support element 150. As to the electrical connection, a first end of the adjusting part 210 is directly or indirectly electrically connected to the second end of the second frame element 122. For instance, in the exemplary embodiment shown in FIG. 2, the first end of the adjusting part 210 is indirectly electrically connected to the second end of the second frame element 122 through a conductive element 220, and a second end of the adjusting part 210 is an open end. The feeding portion 130, the adjusting part 210, the second frame element 122, and the parasitic portion 140 of the mobile communication device 200 together constitute the loop antenna 10-1.

Figure 3:
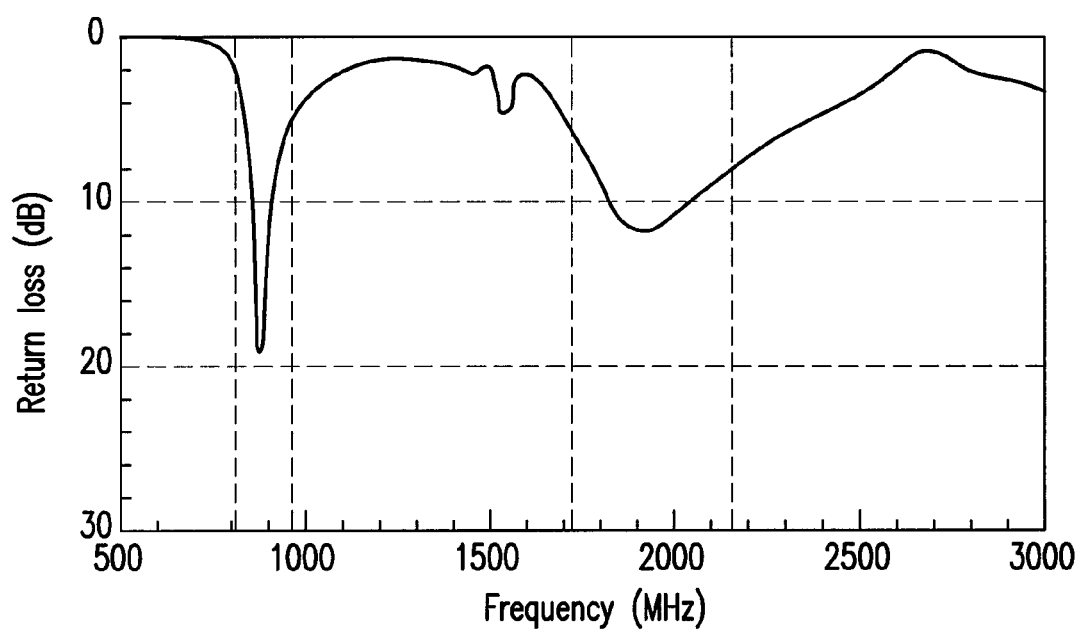
FIG. 3 is a schematic view illustrating simulated return loss of a loop antenna according to an exemplary embodiment of the invention.

As to the operation of the mobile communication device 200, when the first end of the feeding portion 130 receives the feeding signal, the signal from the feeding portion 130 is coupled to the adjusting part 210 and thereby enables the loop antenna 10-1 to excite a plurality of resonant modes. For instance, the loop antenna 10-1 excites a first resonant mode through the feeding portion 130 to receive or emit a first radio frequency signal in the GSM1800/1900/UMTS frequency band. The loop antenna 10-1 may further excite a second resonant mode through the adjusting part 210, the second frame element 122, and the parasitic portion 140 to receive or emit a second radio frequency signal in the GSM850/900 frequency band. FIG. 3 is a schematic view illustrating simulated return loss of a loop antenna according to an exemplary embodiment of the invention. With reference to FIG. 3, the loop antenna 10-1 may excite the second resonant mode covering the GSM850/900 frequency band as well as the first resonant mode covering the GSM1800/1900/UMTS frequency band.

Similar to the embodiment shown in FIG. 1, the present embodiment discloses that the first resonant mode of the loop antenna 10-1 is formed by the feeding portion 130. Accordingly, as to the physical structure, a length of the feeding portion 130 in the loop antenna 10-1 is also ¼ a wavelength of the first radio frequency signal. Different from the loop antenna 10 shown in FIG. 1, the loop antenna 10-1 shown in FIG. 2 excites the second resonant mode not only through the second frame element 122 and the parasitic portion 140 but also through the adjusting part 210. Therefore, in terms of the physical structure of the mobile communication device 200, a length of a path extending from the second end of the adjusting part 210 to the second end of the parasitic portion 140 along the adjusting part 210, the second frame element 122, and the parasitic portion 140 is ¼ a wavelength of the second radio frequency signal.

Namely, by adding the adjusting part 210 to the mobile communication device 200, the requirement that the length of the path is ¼ the wavelength of the second radio frequency signal may be satisfied. In addition to the above, people having ordinary skill in the art may, according to the design demands, elongate the adjusting part 210 and/or the parasitic portion 140 by modifying the shape of the adjusting part 210 and/or the shape of the parasitic portion 140. Thereby, the requirement that the path length along the adjusting part 210, the second frame element 122, and the parasitic portion 140 is ¼ the wavelength of the second radio frequency signal may be satisfied. The parasitic portion 140 shown in FIG. 2 has a bar shape, for instance; however, the parasitic portion 140 described in another exemplary embodiment may have a curve-like shape, for instance. That is, in another exemplary embodiment, the parasitic portion 140 has a bent structure, and the mobile communication device 200 may, through the bent structure of the parasitic portion 140, ensures that the path length along the adjusting part 210, the second frame element 122, and the parasitic portion 140 is ¼ the wavelength of the second radio frequency signal. Similarly, by modifying the adjusting part 210 to have the curve-like shape in another exemplary embodiment of the invention, the requirement that the length of the path is ¼ the wavelength of the second radio frequency signal may be satisfied.

To sum up, the mobile communication device described herein is equipped with the metal frame which embellishes the exterior of the mobile communication device. Besides, parts of the metal frame (i.e., the second frame element) constitute the antenna. Thereby, the negative impact of the metal frame on communication quality of the mobile communication device is lessened. Moreover, the first frame element of the metal frame which cannot serve as the antenna is electrically connected to the ground plane, which is conducive to the improvement of the communication quality of the mobile communication device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A mobile communication device, comprising:
   a substrate, comprising a ground plane and a non-ground area;
   a metal frame, surrounding the substrate, and comprising a plurality of gaps so as to form a first frame element and a second frame element separated from each other, wherein the first frame element is electrically connected to the ground plane;
   a feeding portion, located in the non-ground area, wherein a first end of the feeding portion is configured to receive a feeding signal, and a second end of the feeding portion is an open end; and
   a parasitic portion, located in the non-ground area and electrically connected to the second frame element and the ground plane,
   wherein the feeding portion, the second frame element, and the parasitic portion of the mobile communication device constitute a loop antenna.

2. The mobile communication device as recited in claim 1, wherein the loop antenna excites a first resonant mode through the feeding portion in order to receive or emit a first radio frequency signal, and a length of the feeding portion is ¼ a wavelength of the first radio frequency signal.

3. The mobile communication device as recited in claim 1, wherein a first end of the parasitic portion is electrically connected to a first end of the second frame element, a second end of the parasitic portion is electrically connected to the ground plane, and a second end of the second frame element is an open end.

4. The mobile communication device as recited in claim 1, wherein the loop antenna excites a second resonant mode through the second frame element and the parasitic portion in order to receive or emit a second radio frequency signal, and a length of a path extending from a second end of the second frame element to a second end of the parasitic portion along the second frame element and the parasitic portion is ¼ a wavelength of the second radio frequency signal.

5. The mobile communication device as recited in claim 1, further comprising:
   a support element, located on the non-ground area, wherein the feeding portion is located on a first surface of the support element, and the parasitic portion is located on the first surface and a second surface of the support element.

6. The mobile communication device as recited in claim 1, further comprising:
   an adjusting part, located in the non-ground area and electrically connected to the second frame element, wherein the adjusting part of the mobile communication device constitutes a part of the loop antenna.

7. The mobile communication device as recited in claim 6, wherein a first end of the parasitic portion is electrically connected to a first end of the second frame element, a second end of the parasitic portion is electrically connected to the ground plane, a first end of the adjusting part is electrically connected to a second end of the second frame element, and a second end of the adjusting part is an open end.

8. The mobile communication device as recited in claim 6, wherein the loop antenna excites a second resonant mode through the adjusting part, the second frame element, and the parasitic portion to receive or emit a second radio frequency signal, and a length of a path extending from a second end of the adjusting part to a second end of the parasitic portion along the adjusting part, the second frame element, and the parasitic portion is ¼ a wavelength of the second radio frequency signal.

9. The mobile communication device as recited in claim 6, further comprising:
   a support element, located on the non-ground area, wherein the feeding portion and the adjusting part are located on a first surface of the support element, and the parasitic portion is located on the first surface and a second surface of the support element.

10. The mobile communication device as recited in claim 1, further comprising:
   a transceiver, for providing the feeding signal.

* * * * *